(12) United States Patent
Ouchi et al.

(10) Patent No.: US 10,170,799 B2
(45) Date of Patent: Jan. 1, 2019

(54) MULTI-ELEMENT LIQUID METAL BATTERY

(71) Applicant: Massachusetts Institute of Technology, Cambridge, MA (US)

(72) Inventors: Takanari Ouchi, Brookline, MA (US); Hojong Kim, State College, PA (US); Donald R. Sadoway, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 347 days.

(21) Appl. No.: 14/968,381

(22) Filed: Dec. 14, 2015

(65) Prior Publication Data

US 2016/0172714 A1 Jun. 16, 2016

Related U.S. Application Data

(60) Provisional application No. 62/091,924, filed on Dec. 15, 2014.

(51) Int. Cl.
*H01M 10/39* (2006.01)

(52) U.S. Cl.
CPC ...... *H01M 10/399* (2013.01); *H01M 2220/10* (2013.01); *H01M 2300/0048* (2013.01)

(58) Field of Classification Search
CPC .......... H01M 10/399; H01M 2220/10; H01M 2300/0048

(Continued)

(56) References Cited

U.S. PATENT DOCUMENTS

| 3,238,437 A | 3/1966 | Foster et al. |
| 3,245,836 A | 4/1966 | Agruss |

(Continued)

FOREIGN PATENT DOCUMENTS

| EP | 0078404 A2 | 5/1983 | ............ H01M 14/00 |
| EP | 0327959 | 8/1989 | ............ H01M 10/14 |

(Continued)

OTHER PUBLICATIONS

Agruss, "The Thermally Regenerative Liquid-Metal Cell," Journal of the Electrochemical Society, vol. 110, No. 11, pp. 1097-1103, Nov. 1963.

(Continued)

*Primary Examiner* — Gary D Harris
(74) *Attorney, Agent, or Firm* — Sunstein Kann Murphy & Timbers LLP

(57) ABSTRACT

An electrochemical cell includes a negative electrode having at least two active metals, a positive electrode having a metal or alloy, and an electrolyte having a cation of each of the active metals. The electrolyte defines first and second interfaces with the positive electrode being in contact with the first interface and the negative electrode being in contact with the second interface. The electrolyte is configured to allow the cations of the active metals to be transferred from the negative electrode to the positive electrode during discharging and to be transferred from the positive electrode to the negative electrode during charging. The electrolyte exists as a liquid phase and the negative electrode and the positive electrode exist as liquid or partially liquid phases at operating temperatures of the electrochemical cell.

17 Claims, 7 Drawing Sheets

(58) Field of Classification Search
USPC .................................................. 429/50, 103
See application file for complete search history.

(56) References Cited

U.S. PATENT DOCUMENTS

| | | | |
|---|---|---|---|
| 3,419,432 A | 12/1968 | Hesson | |
| 3,488,221 A | 1/1970 | Shimotake et al. | |
| 3,535,214 A | 10/1970 | Winand | |
| 3,663,295 A | 5/1972 | Baker | |
| 3,716,409 A | 2/1973 | Cairns et al. | |
| 3,775,181 A | 11/1973 | Ryerson | |
| 3,833,421 A | 9/1974 | Rubischko et al. | |
| 3,925,098 A * | 12/1975 | Saunders .............. | H01M 4/581 429/103 |
| 3,933,521 A | 1/1976 | Vissers et al. | |
| 4,011,374 A | 3/1977 | Kaun | |
| 4,158,720 A * | 6/1979 | Kaun ...................... | H01M 4/38 204/293 |
| 4,216,273 A | 8/1980 | Cadart et al. | |
| 4,999,097 A | 3/1991 | Sadoway | |
| 5,185,068 A | 2/1993 | Sadoway | |
| 5,476,733 A | 12/1995 | Coetzer et al. | |
| 6,368,486 B1 | 4/2002 | Thompson et al. | |
| 6,730,210 B2 | 5/2004 | Thompson et al. | |
| 6,733,924 B1 | 5/2004 | Skotheim et al. | |
| 7,504,017 B2 | 3/2009 | Cardarelli | |
| 7,678,484 B2 | 3/2010 | Tao et al. | |
| 8,178,231 B2 | 5/2012 | Soloveichik et al. | |
| 8,202,641 B2 | 6/2012 | Winter et al. | |
| 8,460,814 B2 | 6/2013 | Deane et al. | |
| 8,764,962 B2 | 7/2014 | Allanore et al. | |
| 9,000,713 B2 | 4/2015 | Boysen et al. | |
| 9,076,996 B2 | 7/2015 | Bradwell et al. | |
| 2007/0215483 A1 | 9/2007 | Johansen et al. | |
| 2008/0023321 A1 | 1/2008 | Sadoway | |
| 2008/0044725 A1 | 2/2008 | Sadoway et al. | |
| 2008/0053838 A1 | 3/2008 | Yamaguchi et al. | |
| 2008/0145755 A1 | 6/2008 | Iacovangelo et al. | |
| 2010/0047671 A1 | 2/2010 | Chiang et al. | |
| 2011/0014503 A1 | 1/2011 | Bradwell et al. | |
| 2011/0014505 A1 | 1/2011 | Bradwell et al. | |
| 2011/0200848 A1 | 8/2011 | Chiang et al. | |
| 2012/0264021 A1 | 10/2012 | Sugiura et al. | |
| 2013/0059176 A1 | 3/2013 | Stefani et al. | |
| 2013/0065122 A1 | 3/2013 | Chiang et al. | |
| 2013/0071306 A1 | 3/2013 | Camp et al. | |
| 2014/0113181 A1 | 4/2014 | Bradwell et al. | |
| 2014/0272481 A1* | 9/2014 | Chung ................ | H01M 10/399 429/50 |
| 2015/0004455 A1 | 1/2015 | Bradwell et al. | |
| 2015/0015210 A1 | 1/2015 | Bradwell et al. | |
| 2015/0132627 A1 | 5/2015 | Bradwell et al. | |
| 2015/0132628 A1 | 5/2015 | Bradwell et al. | |
| 2015/0214579 A1 | 7/2015 | Boysen et al. | |
| 2015/0303525 A1 | 10/2015 | Bradwell et al. | |

FOREIGN PATENT DOCUMENTS

| | | | |
|---|---|---|---|
| EP | 0343333 | 11/1989 | .............. H01M 2/06 |
| EP | 1096593 | 5/2001 | ............ H01M 10/48 |
| JP | 55-53877 | 4/1980 | ............ H01M 10/36 |
| JP | 2001-115369 | 4/2001 | ................ D04H 1/46 |
| WO | WO 2008/105811 A2 | 9/2008 | |
| WO | WO 2011/014242 | 2/2011 | .............. H01M 2/14 |
| WO | WO 2011/014243 | 2/2011 | .............. H01M 2/14 |
| WO | WO 2014/062706 | 4/2014 | ............ H01M 10/50 |
| WO | WO 2014/190318 | 11/2014 | ............ H01M 10/04 |

OTHER PUBLICATIONS

Allanore, "A new anode material for oxygen evolution in molten oxide electrolysis," Nature, vol. 497, pp. 353-356, May 16, 2013.

Allanore, "Features and Challenges of Molten Oxide Electrolytes for Metal Extraction," Journal of the Electrochemical Society, vol. 162, No. 1, pp. E13-E22, Nov. 25, 2014.

Atthey, "A Mathematical Model for Fluid Flow in a Weld Pool at High Currents," J. Fluid Mech., vol. 98, Part 4, pp. 787-801, 1980.

Bradwell, "Technical and Economic Feasibility of a High-Temperature Self-Assembling Battery," Thesis, Massachusetts Institute of Technology, Department of Materials Science and Engineering, 136 pages, Sep. 2006.

Bradwell, "Liquid Metal Batteries: Ambipolar Electrolysis and Alkaline Earth Electroalloying Cells," Thesis, Massachusetts Institute of Technology, Department of Materials Science and Engineering, 206 pages, Feb. 2011.

Bradwell et al., "Recycling ZnTe, CdTe, and Other Compound Semiconductors by Ambipolar Electrolysis," Journal of the American Chemical Society, vol. 133, pp. 19971-19975, Oct. 28, 2011.

Bradwell et al., "Supporting Information: Recycling ZnTe, CdTe, and Other Compound Semiconductors by Ambipolar Electrolysis," Journal of the American Chemical Society, pp. S1-S8, Oct. 28, 2011.

Cairns et al., "Galvanic Cells with Fused-Salt Electrolytes," AEC Research and Development, Argonne National Laboratory, Chemical Engineering Division, 44 pages, Nov. 1967.

Cairns et al., "High-Temperature Batteries-Research in high-temperature electrochemistry reveals compact, powerful energy-storage cells," Science, vol. 164, No. 3886, pp. 1347-1355, Jun. 20, 1969.

Cubicciotti et al., "Metal—Salt Interactions High Temperatures: The Solubilities of Some Alkaline Earth Metals in their Halides," Journal of the American Chemical Society, vol. 71, No. 6, pp. 2149-2153, 1949.

Dworkin et al., "The Electrical Conductivity of Solutions of Metals in Their Molten Halides," The Journal of Physical Chemistry, vol. 70, No. 7, pp. 2384-2388, Jul. 1966.

Electroville, Grid-Scale Batteries, ARPA-E, MIT Electroville: High Amperage Energy Storage Device-Energy for the Neighborhood, http://arpa-e.energy.gov/?q=slick-sheet-project/electroville-grid-scale-batteries, 1 page Accessed Jul. 2, 2015.

U.S. Department of Energy, U.S. Department of Energy Categorical Exclusion Determination Form, ARPA-E, 25A/1089-Electroville: High-Amperage Energy Storage Device-Energy Storage for the Neighborhood, 2 pages, Jan. 15, 2010.

Gay et al., "Lithium/Chalcogen Secondary Cells for Components in Electric Vehicular-Propulsion Generating Systems," Argonne National Laboratory, Argonne, Illinois, ANL-7863, 62 pages, Jan. 1972.

Jarrett et al., "Advances in the Smelting of Aluminum," Aluminum Company of America, Metallurgical Treatises, Warrendale, Pennsylvania: The Metallurgical Society of AIME, pp. 137-157, 1981.

Kim et al., "Electrolysis of Molten Iron Oxide with an Iridium Anode: The Role of Electrolyte Basicity," Journal of the Electrochemical Society, vol. 158, No. 10, pp. E101-E105, Aug. 5, 2011.

Kipouros et al., "Toward New Technologies for the Production of Lithium," JOM, pp. 24-26, May 1998.

Magnuski, Innovations in Energy Storage—Professor Don Sadoway Video, MIT Club of Northern California, https://vimeo.com/20906061, 50 pages, Mar. 8, 2011.

Pongsaksawad et al., "Phase-Field Modeling of Transport-Limited Electrolysis in Solid and Liquid States," Journal of the Electrochemical Society, vol. 154, No. 6, pp. F122-F133, 2007.

Sadoway, "The Electrochemical Processing of Refractory Metals," JOM, pp. 15-19, Jul. 1991.

Sadoway, "New opportunities for waste treatment by electrochemical processing in molten salts," Metals and Materials Waste Reduction, Recovery and Remediation, Edited by K.C. Liddell, R.G. Bautista and R.J. Orth, The Minerals, Metals & Materials Society, pp. 73-76, 1994.

Sadoway, "New opportunities for metals extraction and waste treatment by electrochemical processing in molten salts," J. Mater. Res., vol. 10, No. 3, pp. 487-492, Mar. 1995.

Sadoway, A Technical Feasibility Study of Steelmaking by Molten Oxide Electrolysis, presented at 9th AISI/DOE TRP Industry Briefing Session, 16 pages, Oct. 10, 2007.

(56) References Cited

OTHER PUBLICATIONS

Sadoway, "Electrochemical Pathways Towards Carbon-Free Metals Production," presented at GCEP Carbon Management in Manufacturing Industries, 55 pages, Apr. 15, 2008.
Sadoway, "Innovation in Energy Storage: What I Learned in 3.091 was all I Needed to Know," Video, MIT Technology Day 2010, 53 pages, Jun. 5, 2010.
Shimotake et al., "Bimetallic Galvanic Cells With Fused-Salt Electrolytes," Argonne National Laboratory, Argonne, Illinois, pp. 951-962, 1967.
Shimotake et al., "Secondary Cells with Lithium Anodes and Immobilized Fused-Salt Electrolytes," I&EC Process Design and Development, vol. 8, No. 1, pp. 51-56, Jan. 1969.
Villar, "Assessment of High-Temperature Self-Assembling Battery Implementation based on the Aluminum Smelting Process," Thesis, Massachusetts Institute of Technology, Department of Materials Science and Engineering, 129 pages, Sep. 2010.
Weaver et al., "The Sodium|Tin Liquid-Metal Cell," Journal of the Electrochemical Society, vol. 109, No. 8, pp. 653-657, Aug. 1962.

\* cited by examiner

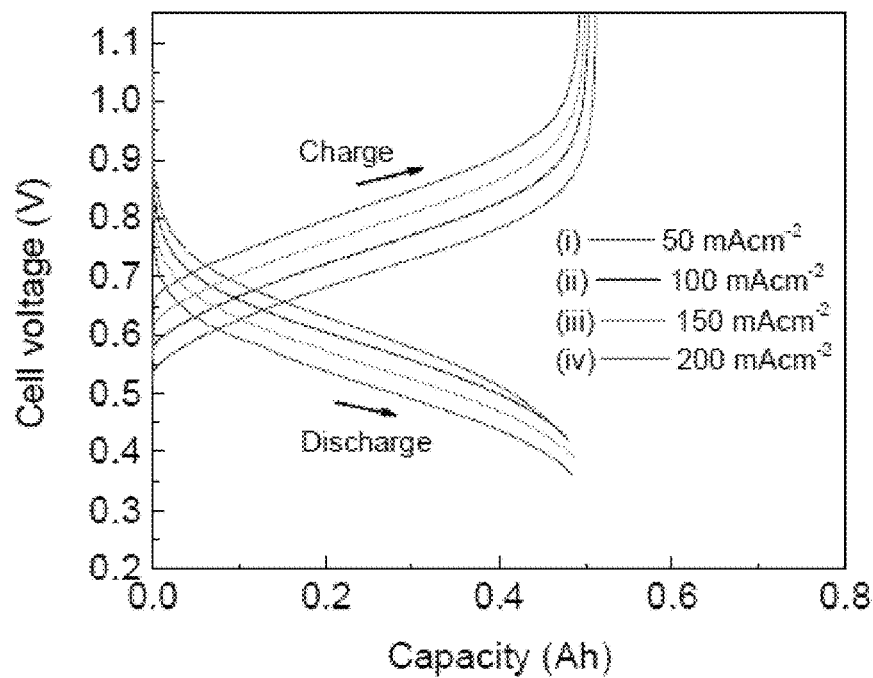
FIG. 4
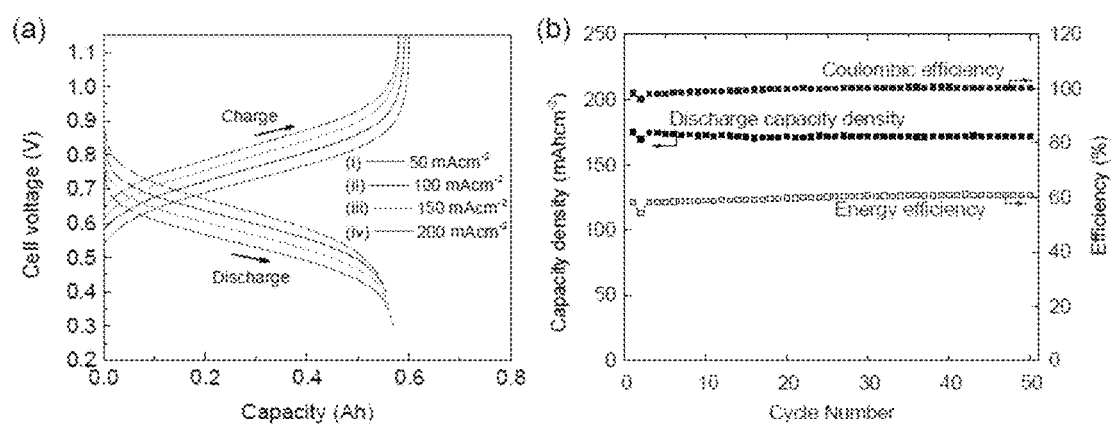
FIG. 5A   FIG. 5B

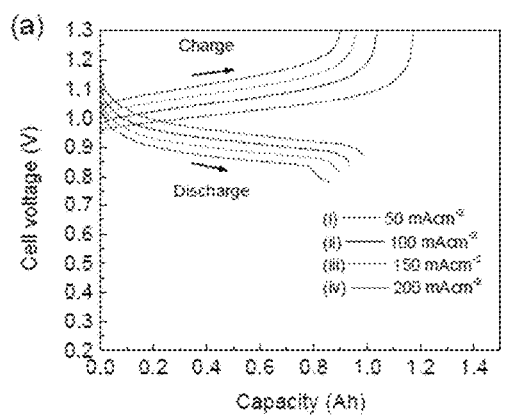
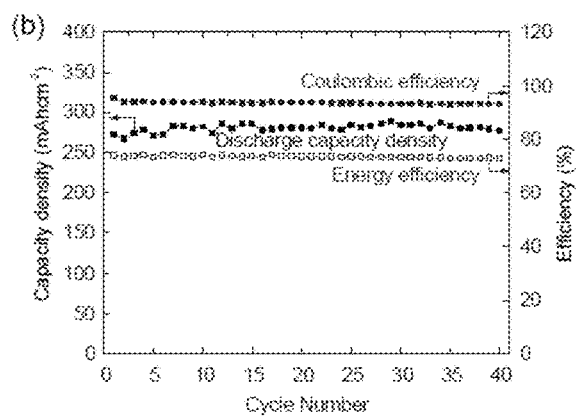
FIG. 10A  FIG. 10B
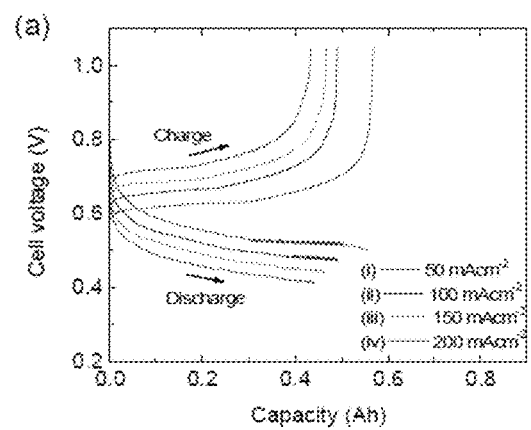
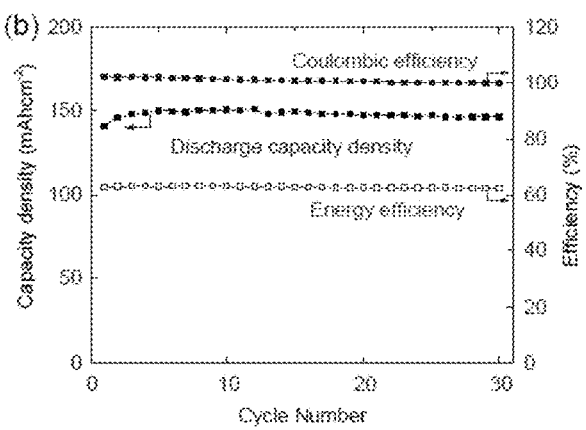
FIG. 11A  FIG. 11B

MULTI-ELEMENT LIQUID METAL BATTERY

CROSS-REFERENCE TO RELATED APPLICATIONS

This patent application claims the benefit of U.S. Provisional Patent Application No. 62/091,924 filed Dec. 15, 2014, the disclosure of which is incorporated by reference herein in its entirety.

STATEMENT REGARDING FEDERALLY SPONSORED RESEARCH OR DEVELOPMENT

This invention was made with Government support under Grant No. DE-AR0000047 awarded by the Department of Energy. The United States Government has certain rights in the invention.

TECHNICAL FIELD

The present invention relates to electrochemical energy storage, and more particularly, to electrochemical energy storage devices with an enhanced energy storage capacity.

BACKGROUND

Balancing supply and demand of electrical energy over time and location is a longstanding problem in an array of applications from commercial generator to consumer. The supply-demand mismatch causes systemic strain that reduces the dependability of the supply, inconveniencing consumers and causing loss of revenue. Since most electrical energy generation in the United States relies on the combustion of fossil fuels, suboptimal management of electrical energy also contributes to excessive emissions of pollutants and greenhouse gases. Renewable energy sources like wind and solar power may also be out of sync with demand since they are active only intermittently. This mismatch limits the scale of their deployment.

Electrochemistry-based technologies offer viable solutions for the storage of energy in an uninterruptible power supply environment. Many types of electrochemical cells have been used for large-scale energy storage. Large-scale electrochemical energy storage devices are valuable for the grid, enabling integration of intermittent renewable energy technologies into base load and performing a variety of electrical services on the conventional grid, e.g., off-peak shifting, load leveling, frequency regulation, to name a few. One type of electrochemical cell is the liquid metal battery in which a pair of electrodes, metal N or its alloy and metal P or its alloy, work in concert as an electron donor (negative electrode) and an electron acceptor (positive electrode), respectively, during discharge. The broad concept of liquid metal batteries has already been disclosed, for example, in U.S. Pat. No. 8,323,816 and U.S. Patent Appl. Publ. Nos. 2011/0014505 and 2012/0104990, which are incorporated by reference herein in their entirety. These cells provide efficient storage capabilities because of the rapid ionic migration and fast, reversible kinetics at both metal electrodes. In a charged state, energy is stored at the negative electrode, which is constituted mainly of a metal, referred to herein as the active metal or anodic metal, at a high chemical potential. In a discharged state, the active metal resides in the positive electrode at a low chemical potential in the form of an alloy. An electrolyte disposed between the two electrodes enables ionic transport of the active metal during charging or discharging.

SUMMARY OF THE EMBODIMENTS

Embodiments disclose galvanic cells using low cost electrodes and electrolytes which rely on a plurality of active metals participating in faradaic reactions thereby improving the performance (e.g., efficiency, energy storage capacity) of the device.

In accordance with one embodiment of the invention, an electrochemical cell includes a negative electrode having at least two active metals, a positive electrode having a metal or alloy, and an electrolyte having a cation of each of the active metals. The electrolyte is bounded by two interfaces, one between it and the positive electrode and one between the electrolyte and the negative electrode. The electrolyte is configured to allow the cations of the active metals to be transferred from the negative electrode to the positive electrode during discharging and to be transferred from the positive electrode to the negative electrode during charging. The electrolyte exists as a liquid phase and the negative electrode and the positive electrode exist as liquid or partially liquid phases at operating temperatures of the electrochemical cell.

In accordance with another embodiment of the invention, a method of exchanging electrical energy with an external circuit includes providing an electrochemical cell, as described above, connecting the electrochemical cell to the external circuit, and operating the external circuit so as to drive transfer of the at least two active metals between the positive electrode and the negative electrode.

In some embodiments, one of the active metals may include an alkali metal, such as lithium. One of the active metals may include an alkaline earth metal, such as calcium or magnesium. One of the active metals may include an alkali metal and another may include an alkaline earth metal. In this case, the electrolyte may include a halide salt of the alkali metal and a halide salt of the alkaline earth metal. One of the active metals may include lithium and another may include calcium. In this case, the electrolyte may include a lithium cation and a calcium cation, such as lithium chloride and calcium chloride. The negative electrode may include a calcium-magnesium-lithium alloy. The cation of the active metals may be selected from the group consisting of halides, oxides, chalcogenides, perchlorates, sulfates, sulfites, carbonates, nitrates, nitrites, and/or hydroxides. The positive electrode may be selected from the group consisting of bismuth, lead, antimony, zinc, tin, and/or magnesium. The external circuit may include a load, a power transmission line, an electric power plant, and/or a renewable energy source. Among others, the electrochemical system may have a total capacity of less than about 30 kWh. In other embodiments, the electrochemical system may have a total capacity of more than about 30 kWh.

BRIEF DESCRIPTION OF THE DRAWINGS

The foregoing features of embodiments will be more readily understood by reference to the following detailed description, taken with reference to the accompanying drawings, in which:

FIG. 2A shows when the cell is discharged, FIG. 2B shows when the cell is in operation and connected to a source of energy (charging circuit), and FIG. 2C shows when the cell is fully charged.

FIG. 3A shows when the cell is fully charged, FIG. 3B shows when the cell is in operation and connected to a load, and FIG. 3C shows when the cell is discharged.

FIG. 4 is a graph of cell voltage as a function of capacity for a Ca—Mg (20-80 mol %)|LiCl—$CaCl_2$|Bi cell at various current densities at 650° C. operating temperature according to embodiments of the present invention.

FIG. 5A is a graph of cell voltage as a function of capacity for a Ca—Mg (20-80 mol %)|LiCl—$CaCl_2$—CaO|Bi cell at various current densities, and FIG. 5B is a graph of capacity density/efficiency as a function of cycle number for the cell showing coulombic efficiency, discharge capacity, and energy efficiency at 650° C. operating temperature according to embodiments of the present invention.

FIG. 10A is a graph of cell voltage as a function of capacity for a Ca—Mg (90-10 mol %)|LiCl—$CaCl_2$|Sb cell at various current densities, and FIG. 10B is a graph of capacity density/efficiency as a function of cycle number for the cell showing coulombic efficiency, discharge capacity, and energy efficiency at 650° C. operating temperature according to embodiments of the present invention.

FIG. 11A is a graph of cell voltage as a function of capacity for a Ca—Mg (90-10 mol %)|LiCl—$CaCl_2$|Pb-Mg (82-18 mol %) cell at various current densities, and FIG. 11B is a graph of capacity density/efficiency as a function of cycle number for the cell showing coulombic efficiency, discharge capacity, and energy efficiency at 550° C. operating temperature according to embodiments of the present invention.

DETAILED DESCRIPTION OF SPECIFIC EMBODIMENTS

Figure 1:
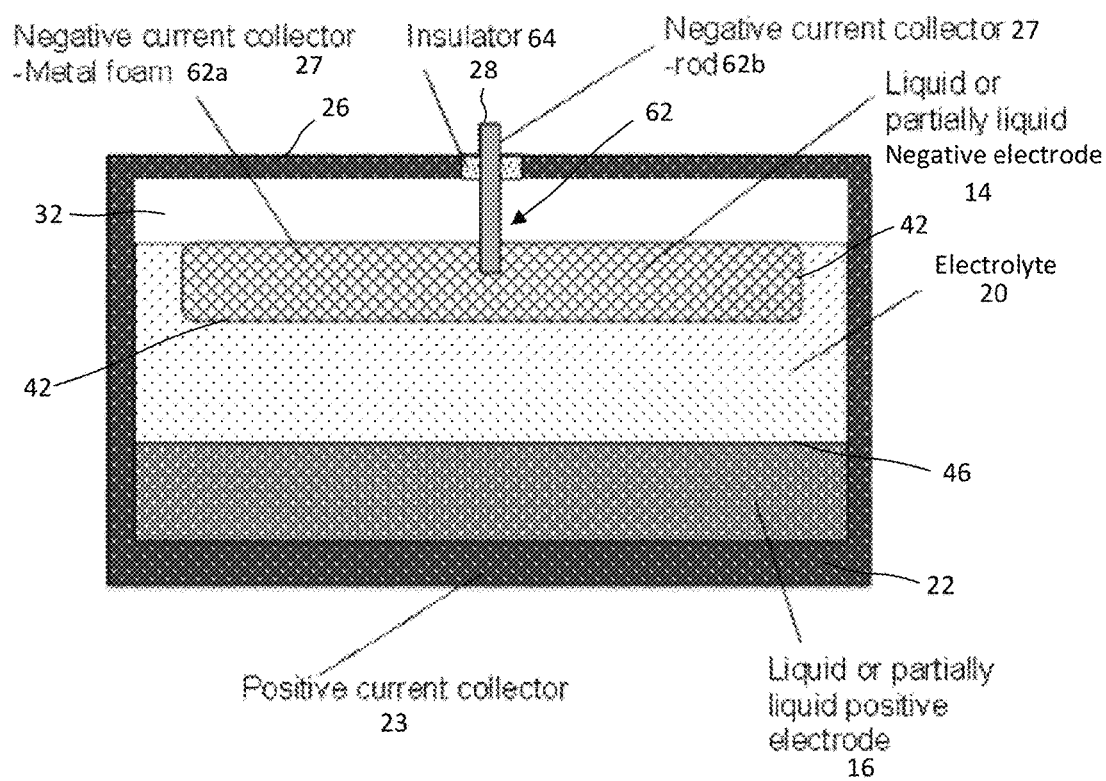
FIG. 1 is a vertical cross-sectional view showing an electrochemical cell according to embodiments of the present invention.

As used in this description, the term "battery" may encompass individual electrochemical cells or cell units having a positive electrode, a negative electrode, and an electrolyte, as well as configurations having an array of electrochemical cells.

Embodiments of the present invention include liquid metal batteries, which have liquid active components that offer fast kinetics and remarkably low capacity fade resulting in long cycle life. Furthermore, the self-segregating design with no need for membranes or separators lends itself to simple manufacturing of large-scale systems with low cost materials. Embodiments disclose, not only another step towards improving cell performance, but also a new concept, namely, a multi-element liquid metal battery in which a plurality of active metals participate in faradaic reactions thereby improving the performance (e.g., efficiency, energy storage capacity) of the device.

In a multi-element liquid metal battery, the negative electrode includes two or more active metals N1, N2, etc., all of which are involved in energy-exchanging, faradaic reactions during charge/discharge. In some cases, other metals, that do not adversely affect the energy-exchanging faradaic reactions, are also contained in the negative electrode. Such spectator metals are termed herein as diluents and are added in order to decrease the liquidus temperature of the negative electrode, and/or to decrease the chemical activities of the active metals or alloys in the negative electrode, etc. The electrolyte includes at least one salt of each active metals in the negative electrode and may include a solution of salts of alkali metals and alkaline-earth metals. The positive electrode includes a metal or its alloy P and may include other metals or diluents that do not adversely affect the energy-exchanging faradaic reactions. Such spectator metals or diluents are added in order to decrease the liquidus temperature of the positive electrode, and/or to decrease the chemical activities of active metals or alloys in the positive electrode, etc. The same diluent may be employed in both the negative and positive electrodes, e.g., (-) Ca—Mg||Pb-Mg (+). Multicomponent alloys, e.g., binary, ternary, quaternary alloys, may be used for the negative and/or positive electrodes.

This multi-element configuration desirably decreases the cell operating temperature, the reactivity of negative electrode with the molten salt electrolyte, and the solubility of the negative electrode in the molten salt electrolyte. This, in turn, decreases the self-discharge current and thus improves the cell performance, even if the metals N1, N2, etc. each has a high melting point, high reactivity, and high solubility in the molten salt, e.g., Ca. For example, a system utilizing a liquid calcium-lithium-magnesium alloy as a negative electrode, a molten salt mixture of lithium chloride and calcium chloride as an electrolyte, and liquid bismuth as a positive electrode exhibits high coulombic and energy efficiencies (99% and 70%, respectively) and long service life time (capacity fade rate of <0.002% $cycle^{-1}$ over >1000 cycles). Details of various embodiments are discussed below.

FIG. 1 shows an electrochemical cell or battery 10, according to embodiments of the present invention, having an electronically conductive layer or negative electrode 14 with two or more active metals N1, N2, etc., such as an alkali metal and/or alkaline earth metal, and an electronically conductive layer or positive electrode 16 with a metallic or metalloid element or alloy P, such as a combination of one or more elements of Groups 12 to 16 of the periodic table of the elements (e.g., Zn, Al, Sn, Pb, Sb, Bi, Te, etc.). These electrodes cooperate to efficiently store and deliver energy across an ionic conductive layer or electrolyte 20. At the operating temperature of the electrochemical cell, the negative and positive electrodes 14, 16 are in a liquid or partially liquid phase during operation, and the electrolyte 20 is in a liquid phase during operation.

The negative electrode 14, positive electrode 16, and electrolyte 20 are confined in a container 22, which preferably includes a lid 26. The cell container 22 and lid 26 may be made of a conductive metal (e.g., mild steel, stainless steel, graphite) or a conductive metal coated with a thin ceramic (e.g., oxide, nitride, carbide). An electronically conductive structure 62 may be suspended from the lid 26 of the container 22 and may serve as a negative current collector 27. The lid 26 confines the molten constituents and vapors within the container 22. An electrically insulating seal 64 (e.g., made of boron nitride, alumina, magnesia) may electrically isolate the conductive structure 62 from the lid 26. The container 22 and lid 26 may be formed from materials having the requisite electrical conductivity (when so required), mechanical strength, and resistance to chemical attack by the materials that form the electrodes 14 and 16 and electrolyte 20.

One portion 62*a* of the structure 62 may hold the negative electrode 14 away from the walls of the container 22, obviating the need for an insulating sheath along the walls, and another portion 62*b* of the structure 62 may extend outside of the lid 26 and serve as the negative terminal 28. The portion 62*a* that holds the negative electrode 14 may be in the shape of one or more rods, an inverted cup, or a mesh (as shown in FIG. 1). The mesh may be composed of strands on the order of 0.1 to 1 mm in diameter, with similar spacing, although other dimensions may also be used. Alternatively, or in addition, the portion 62*a* that holds the negative electrode 14 may be a porous material, e.g., foam or sponge. Depending on the composition of the negative electrode 14, the structure 62 may be made of, e.g., iron or its alloys, carbon or its alloys, such as mild steel, or a steel alloy containing, for example, nickel and/or chromium. Preferably, the negative current collector 27 includes a conductive porous foam or mesh 62*a* (e.g., iron, iron alloys) connected to a rod 62*b*. The electronically conductive structure 62 is preferably configured so that some of the liquid or partially liquid negative electrode 14 remains between the portion 62*a* during the charge and discharge cycles, as discussed in more detail below. Surface tension may maintain the negative electrode 14 in place around the portion 62*a* of the electronically conductive structure 62.

A portion of the container 22 in contact with the positive electrode 16 functions as a positive current collector 23, through which electrons may pass to an external source or load by way of a positive terminal (discussed in FIGS. 2B and 3B below) connected to the container 22. The negative terminal 28 and the positive terminal may be oriented to facilitate arranging individual cell units in series by connecting the negative terminal 28 of one cell unit to the positive terminal of another cell unit 10 to form a battery or electrochemical cell. Alternatively, the negative terminals 28 may be connected to one another, and the positive terminals may be connected to one another to arrange the cells in parallel.

Alternatively, the interior surface of the container 22 may include an insulating inner sheath (not shown). The sheath may prevent shorting by electrical conduction between the negative electrode 14 and the positive electrode 16 through the container 22 when the container is made of electrically conductive material and an electrically conductive structure 62 is not used to hold the negative electrode 14 away from the walls of the container 22. The sheath may be formed from an electrically insulating material and should be corrosion-resistant against the electrodes 14 and 16 and the electrolyte 20. For example, boron nitride, aluminum nitride, alumina, and/or magnesia are appropriate materials for the sheath and seal 64, although other materials, such as high temperature resistant polymers, like poly(oxyethylene) methacrylate-g-poly(dimethyl siloxane) (POEM-g-PDMS), also may be used.

The electrochemical cell 10 also may have an inert gas layer 32 overlaying the negative electrode 14 and the portion 62*a* of the electrically conductive structure 62 in order to accommodate global volume changes in the three-phase system produced by charging and discharging, or temperature changes. Optionally, the lid 26 or seal 64 may incorporate a safety pressure valve (not shown) in order to regulate changes in pressure within the electrochemical cell 10.

The electrochemical cell 10 according to embodiments of the present invention receives or delivers energy by transporting two or more metals in the negative electrode 14, referred to herein as active metals N1, N2, etc., between the two electrically conductive electrodes 14 and 16 via an electrochemical pathway. The liquid electrolyte 20, including at least one salt of each active metal in the negative electrode 14, enables ionic transport of the active metals during charging or discharging. Embodiments of the present invention may include any combination of metals or metal alloys which exhibit a suitable voltage. For example, the chemical composition of the negative electrode 14 may include two or more metals, such as an alkali metal and/or alkaline earth metal, e.g., Li, Na, K, Mg, Ca, Ba, or combinations thereof, and the positive electrode 16 may include one or more elements of Groups 12 to 16 of the periodic table of the elements, such as Al, Si, Zn, Ga, Ge, Cd, In, Sn, Sb, Hg, Tl, Pb, Bi, Te, or combinations thereof. For example, the negative electrode 14 may be calcium-magnesium-lithium and the positive electrode 16 may be bismuth, lead or antimony. The electrolyte 20 may include a multi-cation solution of salts of alkali metals and alkaline earth metals. For example, the electrolyte 20 may include halides, oxides, chalcogenides, perchlorates, carbonates, hydroxides, nitrates, nitrites, sulfates, sulfites, or combinations thereof.

In the multi-cation electrolyte 20, a plurality of cations in the salt may contribute to the faradaic charge/discharge of the cells by co-alloying/co-dealloying with the negative electrode 14 and positive electrode 16. The electrodes 14 and 16 and the electrolyte 20 are selected so that the electrodes 14, 16 are maintained in a liquid or partially liquid phase with the co-alloying/co-dealloying of multiple cations from the multi-cation electrolyte 20 at operating temperatures of the electrochemical cell 10. The electrodes 14 and 16 and the electrolyte 20 may be further formulated so that their densities are ordered in accordance with their functions in the cell 10. Various embodiments having respective densities increasing or decreasing in the order negative electrode 14/electrolyte 20/positive electrode 16, so that the cell 10 spontaneously self-assembles into a vertically stacked, layered structure upon melting the constituents, such as shown in FIG. 1, providing for simpler manufacture. Preferably, a low-density negative electrode, middle-density molten salt solution, and high-density positive electrode are layered in order of their densities in the electrochemical cell 10.

Figure 2:
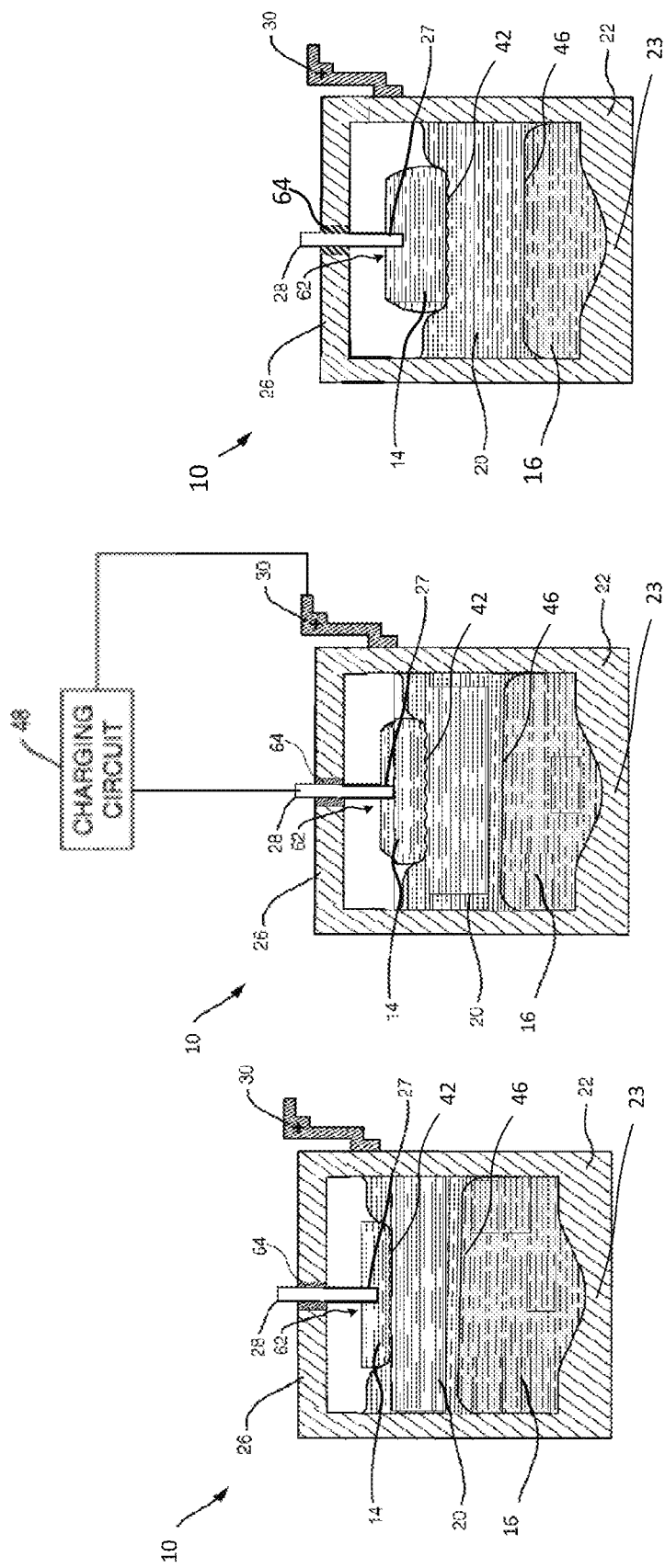
FIGS. 2A-2C are vertical cross-sectional views illustrating the charging process of an electrochemical cell according to embodiments of the present invention.

FIGS. 2A-2C illustrate the function of the electrochemical cell 10 during charging according to embodiments of the present invention. FIG. 2A shows the cell 10 in an uncharged or discharged state. Before charging, the positive electrode 16 includes the active metals N1, N2, etc., along with the metallic or metalloid element P. The positive electrode 16 may be in a liquid phase, such as shown in FIG. 2A, or may include liquid and solid phases. The negative electrode 14 meets the electrolyte 20 at negative electrode-electrolyte interface 42. In a corresponding manner, the positive electrode 16 meets the electrolyte 20 at a separate positive electrode-electrolyte interface 46. As shown and discussed below, these interfaces move during charging and discharging, while maintaining the general volume of the electrolyte 20, and the volumes of the negative electrode 14 and positive electrode 16 increase or decrease at the expense of one another. In other words, the positive electrode 16 has a volume that increases or decreases in correlation to a respective decrease or increase of the volume of the negative electrode 14.

FIG. 2B shows the effect of the charging process on the components of the cell 10. To initiate charging, the terminals 28 and 30 are connected to an external charging circuit 48, which drives the active metals, N1, N2, etc., from the positive electrode 16, through the electrolyte 20 to neutral metal at a higher chemical potential in the negative electrode 14. During charging, electron current travels from the external circuit, through the negative current collector 27, into the negative electrode 14, and to the negative electrode-electrolyte interface 42. Active cations N1+, N2+, etc. move across the electrolyte 20 toward the negative electrode-electrolyte interface 42. The active cations and the electrons meet at the interface 42 and are consumed in the reduction half-cell reaction, e.g., shown for N1 as N1++e−→N1. The neutral active metal atoms N1, N2, etc. created in the half-cell reactions accrue to the negative electrode 14. As the active metals N1, N2, etc. accumulate in the negative electrode 14, the negative electrode-electrolyte interface 42 along the bottom of the negative electrode 14 moves further away from the lid 26 of the container. At the positive electrode-electrolyte interface 46, atoms of the active metals N1, N2, etc. in the positive electrode 16 are oxidized in the half-cell reaction, shown for N1 as N1→N1++e−. As active cations N1+, N2+, etc. enter the electrolyte 20, electrons are freed to pass through the positive current collector 23 to the external charging circuit 48. Oxidation of the active metal atoms N1, N2, etc. shrinks the positive electrode 16, and the positive electrode-electrolyte interface 46 moves toward the positive current collector 23.

FIG. 2C shows the cell 10 in its final charged state. Charging has changed the composition of at least the positive electrode 16 by loss of atoms of the active metals N1, N2, etc. In fact, in some embodiments, the positive electrode 16 may be nominally free of the active metals N1, N2, etc. at this point in the charge-discharge cycle. In general, the volume of the negative electrode 14 has grown at the expense of the positive electrode 16. Since the charging process is conservative with respect to the active cations, the volume of the electrolyte 20 is in principle unchanged.

The active metals N1, N2, etc. deposited in the negative electrode 14 represents stored electrical energy which may persist substantially indefinitely, as long as no external electric path joins the two electrodes 14 and 16. The half-cell reactions in the cell 10 generate liquid or partially liquid phase products that remain at the electrodes 14 and 16, and in contact with the electrolyte 20. While the electrodes 14, 16 and electrolyte 20 may remain in their liquid or partially liquid state at an operating temperature of the cell 10, the active metals and the active cations are available to mechanize charge and discharge via an electrochemical pathway. This reversibility renders the electrochemical cell 10 suitable to use in batteries for energy storage.

Figure 3:
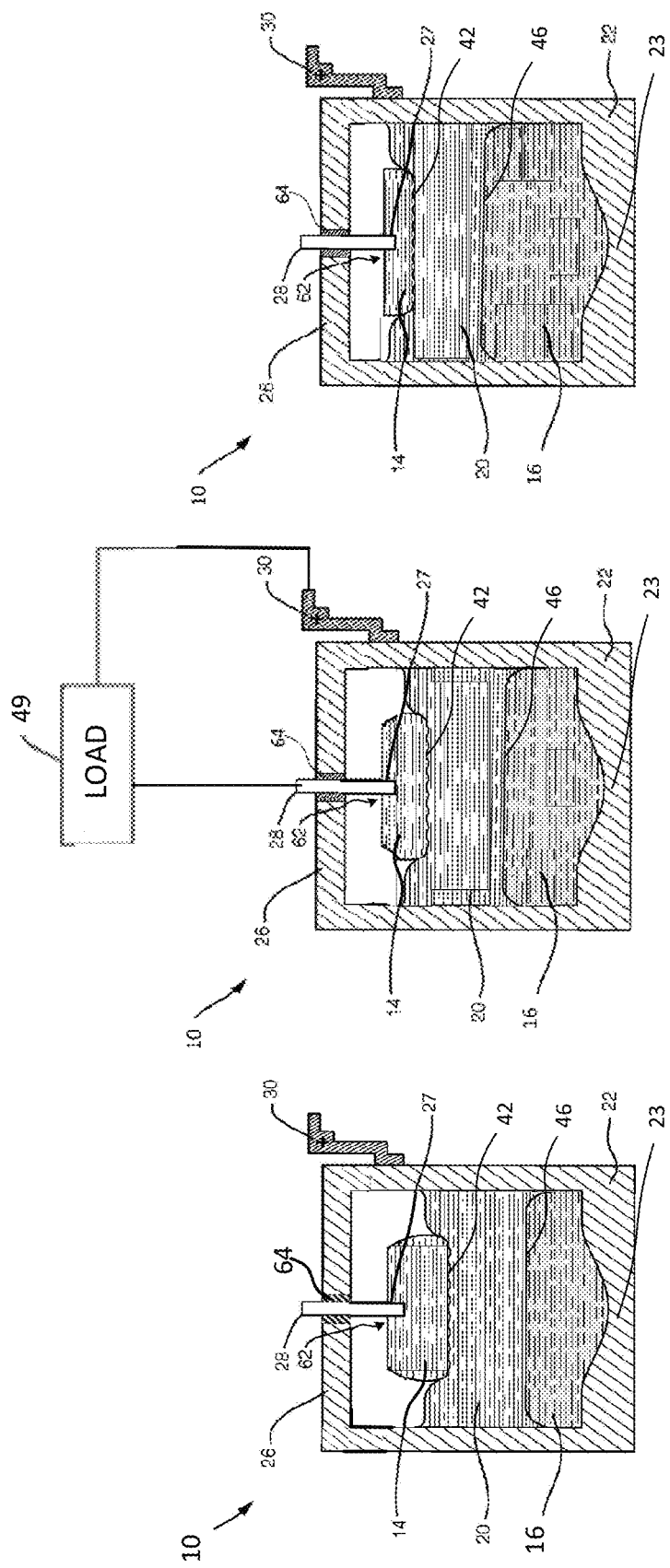
FIGS. 3A-3C are vertical cross-sectional views illustrating the discharging process of an electrochemical cell according to embodiments of the present invention.

FIGS. 3A-3C illustrate discharging the electrochemical cell 10 according to embodiments of the present invention. FIG. 3A shows the cell 10 in a charged state, while FIG. 3B shows the cell terminals 28 and 30 connected to an external load 49, which initiates discharge. During discharge, the active metals N1, N2, etc. move spontaneously from the negative electrode 14, through the electrolyte 20 as active cations, and revert to neutral metals at a lower chemical potential in the positive electrode 16. Electron current travels into the cell through the positive current collector 23 and the positive electrode 16, to the positive electrode-electrolyte interface 46. Active cations N1+, N2+, etc. migrate across the electrolyte 20 toward the positive electrode-electrolyte interface 46. Active cations N1+, N2+, etc. and electrons are consumed at the interface 46 in the reduction half-cell reaction, shown for N1 as N1++e−→N1. The neutral active metal atoms N1, N2, etc. produced accrue to the positive electrode 16. As the active metal N1, N2, etc. accumulates in the positive electrode 16, the positive electrode-electrolyte interface 46 moves further away from the positive current collector 23. At the negative electrode-electrolyte interface 42, atoms of the active metal N1, N2, etc. in the negative electrode 14 are oxidized in the half-cell reaction, shown for N1 as N1→N1++e−. The active cations N1+, N2+, etc. produced enter the electrolyte 20, and the freed electrons pass through the negative current collector 27 to the external load 49. Oxidation of the active metal atoms causes attrition of the negative electrode 14, with the negative electrode-electrolyte interface 42 along the bottom of the negative electrode 14 moving toward the lid 26 of the container.

FIG. 3C shows the electrochemical cell 10 in its final discharged state. Discharging has changed the composition of at least the positive electrode 16, and the volume of the positive electrode 16 grows at the expense of the negative electrode 14. Since the discharging process is conservative with respect to the active metal cations, ideally the volume of the electrolyte 20 is unchanged.

One potential use for the electrochemical cells 10 according to embodiments of the present invention is in large-scale power generators. The diurnal fluctuation in energy demand reduces plant efficiency, consequently increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods, and then uploading power to the grid during times of higher demand, permitting the power plant to operate at a more constant level—with fewer power spikes.

A second potential use for the electrochemical cells 10 according to embodiments of the present invention is in renewable energy source converters. Variability in supply makes management of power generated by renewable sources challenging. Sources such as wind and solar energy generate only intermittently. Without adequate power storage, additional power generators are needed on standby to operate in the event that the wind stops blowing, or the sky clouds over. The underutilized capital in the form of excess power generators ultimately may limit the scale of deployment of renewable energy sources. A reliable, high-capacity electrical storage device, used in conjunction with a renewable energy source, should provide dedicated load leveling, thus supporting implementation of renewable energy sources on the grid. Such a combination should also support the use of intermittent renewable energy sources as an alternative to generators in remote, off-grid locations, e.g., locations where periodic delivery of fuel may be difficult.

Embodiments in many large-scale implementations are expected to have a capacity of greater than about 30 kWh. However, an electrochemical cell 10 according to embodiments of the present invention with a capacity lower than 30 kWh may be implemented at a small commercial or residential level, where an energy source, such as solar panels or individual wind turbines, may be used to charge the cell. Such a system should provide a continuous source of electricity to sustain the energy needs of the commercial or residential facility. These types of systems may be used advantageously in remote locations, off the grid, where the import of electricity with power lines is exorbitant or not practicable. Of course, such systems may be used in various other environments, such as in an urban or suburban environment where a household could self-consume power generated by a rooftop photovoltaic array by managing local power production and demand with the proposed device.

Embodiments of the present invention may achieve enhanced energy storage capacity while using low-cost, abundant metals. Selection of the active metals and the electrolyte in various combinations, such as discussed herein, permits a self-assembling cell and enables low-cost manufacturing. Embodiments of the present invention extend the materials selection of electrodes and electrolytes that may be used in liquid metal batteries. For example, some alkaline and alkaline earth metals which are highly soluble in their molten salts, and therefore not conventionally employable in high temperature molten salt batteries, may become employable.

The discussion below includes the theory behind the improved performance of multi-element liquid metal batteries, and calcium-based liquid metal batteries in particular. However, embodiments of the present invention are not limited by any particular theory. Using the example of a calcium-based liquid metal battery, it is believed that calcium-based chemistries were problematic due to the dissolution of the calcium metal in its molten halide salts, which increases electronic conductivity of the electrolyte and provides a mechanism for self-discharge, which decreases coulombic efficiency of the calcium-based liquid metal batteries. The most likely mechanism of calcium metal dissolution in calcium halide salts is forming dimeric subvalent ions, $Ca_2^{2+}$, as shown in equation (1)

$$Ca + Ca^{2+} \leftrightarrow Ca_2^{2+} \tag{1}$$

When mechanism (1) dominates, the concentration of dissolved calcium, $[Ca_2^{2+}]$, is directly proportional to the activity of the calcium metal and the concentration of calcium ion dissolved species (assuming a Henrian solution):

$$K_{sp} \propto \frac{[Ca_2^{2+}]}{a_{Ca}[Ca^{2+}]} \tag{2}$$

Thus, the solubility of calcium in calcium halide salt, $[Ca_2^{2+}]$, decreases as the activity of calcium in the negative and positive electrodes, $\alpha_{Ca}$, and the concentration of calcium cation in the salts $[Ca^{2+}]$ decrease. Furthermore, the solubility of calcium metal in calcium halide salts decreases with decreasing operating temperature due to its thermochemical properties.

In order to decrease the solubility of calcium in the electrolyte, embodiments of the present invention use a multi-cation salt as the electrolyte 20. For example, the electrolyte 20 may be a mixture of alkali metal and alkali-earth metal halides, including at least one halide of calcium (metal N1). Choosing the proper composition of multi-cation salts lowers the liquidus temperature of the salt and decreases the concentration of the calcium cation in salt, $[Ca^{2+}]$. In some embodiments, the halides of the other cations work as supporting electrolytes to obtain low voltage loss due to electrolyte resistance. For example, lithium chloride is a preferred supporting electrolyte for utilizing a calcium chloride as the calcium source in order to obtain high ionic conductivity (~3 S cm$^{-1}$). This approach decreases the operating temperature of the cell, the reactivity of the calcium, and the solubility of the calcium metal in the electrolyte 20. Furthermore, Ca ion and other cations in the multi-cation salt 20 co-alloy and co-dealloy with both the negative electrode 14 and positive electrode 16 during the charge-discharge cycles. Therefore, the liquid metal battery with multi-cation salt becomes a multi-element liquid metal battery.

EXAMPLES

The self-discharge current of electrochemical cells with several different compositions of negative electrode and electrolytes were measured, as shown in Table 1 below, to proof the validity of the approaches.

TABLE 1

| Self-discharge current densities at 1.25 V. | | | | | |
|---|---|---|---|---|---|
| Negative electrode as prepared* | Salt | Description | Composition (mol %) | Temperature (° C.) | $J_{self}$ (mA cm$^{-2}$) |
| Ca | CaCl$_2$ | pure CaCl$_2$ | — | 800 | >1000 (not measureable) |
| Ca | CaCl$_2$—CaI | All [Ca$^{2+}$] salt | 51.4-48.6 | 650 | >300 |
| Ca | LiCl—CaCl$_2$ | Test pure Ca with multi-cation salt | 65-35 | 650 | ~10 |
| Ca—Mg (20-80) | LiCl—CaCl$_2$ | Test [Li$^+$] in salt | 65-35 | 650 | ~1 |
| Ca—Mg (20-80) | LiCl—KCl—CaCl$_2$ | Test [K$^+$] + [Li$^+$] in salt | 37-28-35 | 650 | ~4 |

TABLE 1-continued

Self-discharge current densities at 1.25 V.

| Negative electrode as prepared* | Salt | Description | Composition (mol %) | Temperature (° C.) | $J_{self}$ (mA cm$^{-2}$) |
|---|---|---|---|---|---|
| Ca—Mg (20-80) | LiCl—CaCl$_2$—CaO | Test CaO in salt | 59-32-9 | 650 | ~3 |
| Ca—Mg (90-10) | LiCl—CaCl$_2$ | Change Ca—Mg composition | 65-35 | 650 | ~4 |

*Composition of the negative electrode may change during charging by using the multi-cation.

The Ca|CaCl$_2$|Bi system at 800° C., which is higher than the melting point of CaCl$_2$ (772° C.), shows higher than 1000 mAcm$^{-2}$ of self-discharge current density (which was not measurable). By utilizing CaCl$_2$—CaI$_2$ (multi-anion salt, i.e., single-cation salt), the operating temperature can be reduced. The self-discharge current density of the cell with pure Ca metal as the negative electrode (Ca|CaCl$_2$—CaI$_2$|Bi system) at 650° C. became lower (>300 mAcm$^{-2}$) due to the lower operating temperature. By using a mixture of LiCl and CaCl$_2$ (multi-cation salt), the self-discharge current of Ca|LiCl—CaCl$_2$|Bi cell at 650° C. was dramatically decreased to ~10 mAcm$^{-2}$.

To decrease the solubility of calcium, Ca (metal A) was alloyed with Mg (diluent), which decreased the self-discharge current density at 650° C. to ~1 mAcm$^{-2}$ (Ca—Mg (20-80 mol %)|LiCl—CaCl$_2$|Bi cell). By adding KCl or CaO into the LiCl—CaCl$_2$ salt, the self-discharge current density slightly increased from the LiCl—CaCl$_2$ salt alone, but the values were small.

In the Ca—Mg|LiCl—CaCl$_2$|Bi cell, upon discharging, calcium and lithium are electrochemically oxidized from the negative electrode such as Ca—Li—Mg alloy [Ca and Li (in Mg)→nCa$^{2+}$+mLi$^+$+(2n+m)3e$^-$], and the calcium cations and the lithium cations are conducted across the molten salt electrolyte to the Bi positive electrode as electrons are released to an external circuit. The calcium cations and the lithium cations are simultaneously reduced and alloyed with Bi positive electrode [nCa$^{2+}$+mLi$^+$+(2n+m)e$^-$→Ca and Li (in Bi)]. Cell voltage correlates to the difference in calcium activity and lithium activity in the negative and positive electrodes according to the Nernst equation (4)

$$E_{cell,eq} = -\frac{RT}{zF} \ln\left( \frac{a_{Ca(inMg)} a_{Li(inMg)}}{a_{Ca(inB)} a_{Li(inBi)}} \right) \quad (4)$$

In this cell, multiple elements, i.e., Ca and Li, work as active species for faradaic charge/discharge processes, such as discussed in embodiments of the present invention. Allowing the co-alloying and co-dealloying of the other cation and controlling them are unique features of embodiments of the present invention. This concept allows the use of high Li containing salts to suppress the solubility of Ca in the molten salt and results in the low self-discharge. The cell performance of multi-element liquid metal batteries formed according to embodiments of the present invention is disclosed in the examples below and shown in FIGS. 4-11B. The active component amounts for the various examples are shown in Table 2 below.

TABLE 2

Amount of active components in cells

| Example no. | Nagative electrode | | | Positive electrode | | | | Electrolyte (g) |
|---|---|---|---|---|---|---|---|---|
| | Ca (g) | Mg (g) | Bi (g) | Bi (g) | Sb (g) | Pb (g) | Mg (g) | |
| 1 | 0.397 | 0.964 | — | 6.00 | — | — | — | 13.1 |
| 2 | 0.540 | 1.309 | — | 14.0 | — | — | — | 12.0 |
| 3-1 | 0.899 | 0.061 | — | 14.0 | — | — | — | 12.0 |
| 3-2 | 1.276 | 0.086 | — | 14.0 | — | — | — | 12.0 |
| 3-3 | 0.322 | 0.022 | — | 2.80 | — | — | — | 12.0 |
| 4 | 1.173 | 0.079 | — | — | 8.19 | — | — | 12.5 |
| 5 | 1.198 | 0.081 | — | — | — | 9.67 | — | 13.1 |
| 6 | 1.129 | 0.076 | — | — | — | 8.28 | 0.214 | 12.0 |

Example 1

A Ca—Mg (20-80 mol %)|LiCl—CaCl$_2$ (65-35 mol %)|Bi cell was assembled. The amounts of active components as prepared are listed in Table 2, example 1. The cell was charged and discharged at 50-200 mAcm$^{-2}$ at 650° C. to evaluate the capability of charge-discharge rate and round trip efficiencies. The cell performances are shown in FIG. 4. Cut-off voltage for charging was 1.15 V at all current densities and cut off voltage for discharge was 0.45, 0.42, 0.39, and 0.36 V at 50, 100, 150, and 200 mAcm$^{-2}$, respectively. In this cell, lithium co-deposited with calcium in both the negative and the positive electrodes. Therefore, the cell becomes Ca—Mg-Li|LiCl—CaCl$_2$|Bi cell. Coulombic efficiencies at 50, 100, 150, and 200 mAcm$^{-2}$ were 90, 95, 97, and 98%, respectively. Coulombic efficiency increased with increasing current density of charge/discharge. Energy efficiencies at 50, 100, 150, and 200 mAcm$^{-2}$ were 78, 75, 68, and 62%, respectively. The nominal discharge voltage at 50, 100, 150, and 200 mAcm$^{-2}$ were 0.62, 0.59, 0.56, and 0.52 V, respectively.

Example 2

A Ca—Mg (20-80 mol %)|LiCl—CaCl$_2$—CaO (59-32-9 mol %)|Bi cell was assembled. The amounts of active components are listed in Table 2, example 2. The cell was charged and discharged at 650° C. to evaluate the capability of charge-discharge rate and round trip efficiencies. Cut-off voltage for charging was 1.15 V at all current densities and cut-off voltage for discharge was 0.45, 0.42, 0.39, and 0.36 V at 50, 100, 150, and 200 mAcm$^{-2}$, respectively. The cell performances are shown in FIGS. 5A and 5B. Coulombic efficiencies at 50, 100, 150, and 200 mAcm$^{-2}$ were 88, 93, 96, and 98%, respectively. Energy efficiencies at 50, 100, 150, and 200 mAcm$^{-2}$ were 74, 70, 64, and 58%, respectively. The nominal discharge voltage at 50, 100, 150, and 200 mAcm$^{-2}$ were 0.63, 0.60, 0.55, and 0.52 V, respectively. While the efficiencies were decreased by adding CaO in the system due to the slightly higher self-discharge current densities (~3 mAcm$^{-2}$), the cell successfully cycled with small capacity fade (0.02% cycle$^{-1}$). In this cell, lithium co-deposited with calcium in both the negative and the positive electrodes. Therefore, the cell becomes Ca—Mg-Li|LiCl—CaCl$_2$—CaO|Bi cell.

Example 3

Figure 6A:
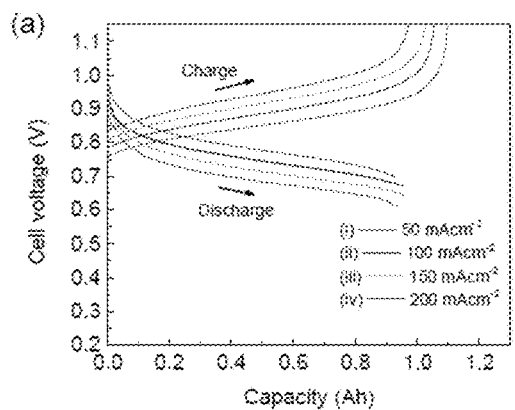
FIG. 6A is a graph of cell voltage as a function of capacity for a Ca—Mg (90-10 mol %)|LiCl—$CaCl_2$|Bi cell at various current densities.
Figure 6B:
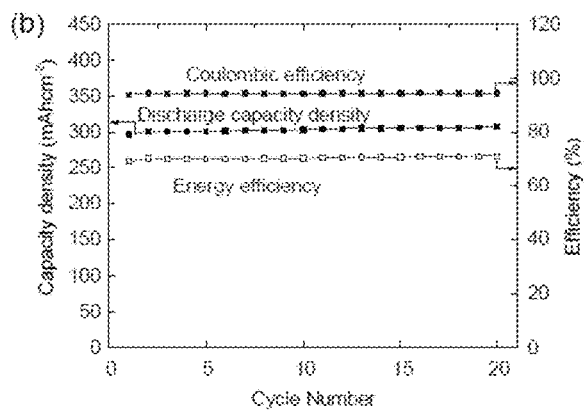
FIG. 6B is a graph of capacity density/efficiency as a function of cycle number for the cell showing coulombic efficiency, discharge capacity, and energy efficiency at 650° C. operating temperature according to embodiments of the present invention.

The cell voltage increases with increasing calcium composition in the calcium-magnesium negative electrode. An electrochemical cell, Ca—Mg (90-10 mol %)|LiCl—CaCl$_2$ (65-35 mol %)|Bi system was assembled. The amounts of active components are listed in Table 2, example 3-1. The cell was charged and discharged at 50-200 mAcm$^{-2}$. At 650° C., the cut-off voltage for charging was 1.15 V at all current densities and the cut-off voltages for discharge were 0.7, 0.67, 0.64, and 0.61 V at 50, 100, 150, and 200 mAcm$^{-2}$, respectively. The cell performances are shown in FIGS. 6A and 6B. Coulombic efficiencies at 50, 100, 150, and 200 mAcm$^{-2}$ were 84, 89, 93, and 96%, respectively. Energy efficiencies at 50, 100, 150, and 200 mAcm$^{-2}$ were 76, 76, 73, and 70%, respectively. The nominal discharge voltage at 50, 100, 150, and 200 mAcm$^{-2}$ were 0.79, 0.76, 0.73, and 0.70 V, respectively. By using LiCl—CaCl$_2$ as an electrolyte, the calcium-magnesium negative electrode with high calcium activity successfully worked with small self-discharge current density (~4 mAcm$^{-2}$ at 1.25V).

Figure 7A:
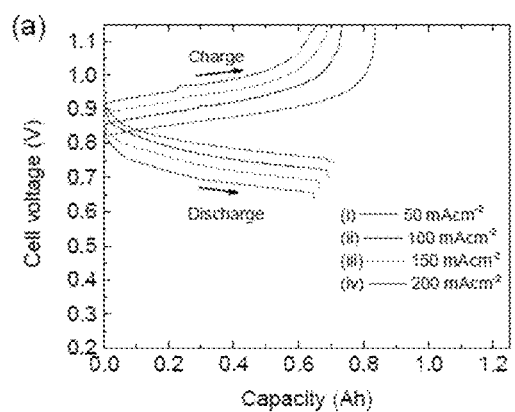
FIG. 7A is a graph of cell voltage as a function of capacity for a Ca—Mg (90-10 mol %)|LiCl—$CaCl_2$|Bi cell at various current densities.
Figure 7B:
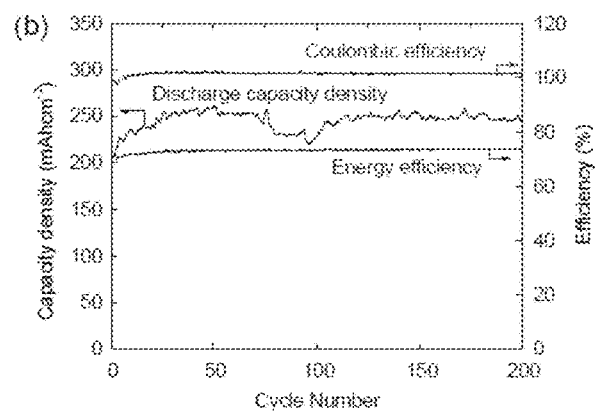
FIG. 7B is a graph of capacity density/efficiency as a function of cycle number for the cell showing coulombic efficiency, discharge capacity, and energy efficiency at 550° C. operating temperature according to embodiments of the present invention.

A cell operated at 550° C. showed better coulombic efficiency than at 650° C. due to the smaller solubility of calcium in the electrolyte, which results in small self-discharge current density. The amounts of active components are listed in Table 2, example 3-2. At 550° C., the cut-off voltage for charging was 1.15 Vat all current densities and the cut-off voltages for discharge were 0.73, 0.70, 0.67, and 0.64 V at 50, 100, 150, and 200 mAcm$^{-2}$, respectively. The cell performances are shown in FIGS. 7A and 7B. Coulombic efficiencies at 50, 100, 150, and 200 mAcm$^{-2}$ were 89, 95, 96, and 99%, respectively. Energy efficiencies at 50, 100, 150, and 200 mAcm$^{-2}$ were 80, 79, 74, and 71%, respectively. The nominal discharge voltage at 50, 100, 150, and 200 mAcm$^{-2}$ were 0.80, 0.77, 0.74, and 0.71 V, respectively. This cell cycled with small capacity fade for 200 cycles (<0.01% cycle$^{-1}$).

Figure 8A:
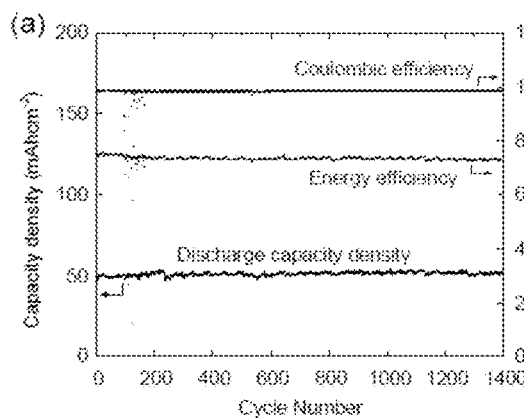
FIG. 8A is a graph of capacity density/efficiency as a function of cycle number for a Ca—Mg (90-10 mol %)|LiCl—$CaCl_2$|Bi cell.
Figure 8B:
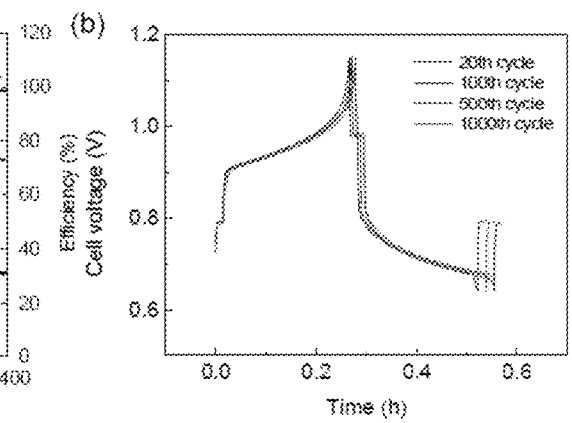
FIG. 8B is a graph of cell voltage as a function of time for the cell for various cycles at 550° C. operating temperature according to embodiments of the present invention.

In order to accelerate the cycles, the amount of active components decreased as listed in Table 2, example 3-3. The cell was operated at 200 mAcm$^{-2}$ of current density over 1000 cycles with small capacity fade (<0.002% cycle$^{-1}$). Coulombic efficiency, energy efficiency, and discharge capacity density with cycling and charge and discharge profiles at 20$^{th}$, 100$^{th}$, 500$^{th}$, and 1000$^{th}$ cycles are shown in FIGS. 8A and 8B. Almost no difference of charge/discharge profile was confirmed for 1000 cycles.

In these cells, lithium co-deposited with calcium in both the negative and the positive electrodes. Therefore, the cells become Ca—Mg-Li|LiCl—CaCl$_2$|Bi cells.

Example 4

Figure 9A:
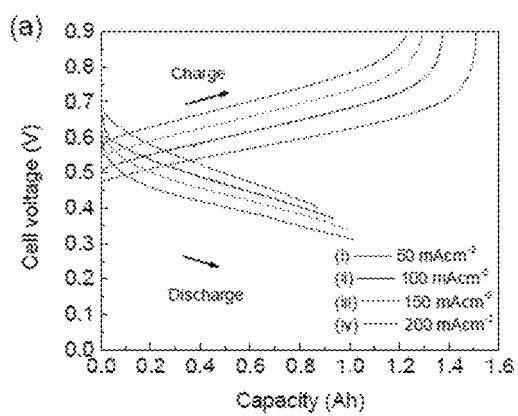
FIG. 9A is a graph of cell voltage as a function of capacity for a Ca—Mg (90-10 mol %)|LiCl—$CaCl_2$|Pb cell at various current densities.
Figure 9B:
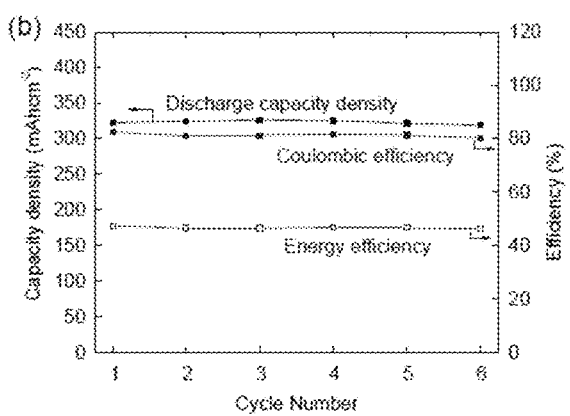
FIG. 9B is a graph of capacity density/efficiency as a function of cycle number for the cell showing coulombic efficiency, discharge capacity, and energy efficiency at 650° C. operating temperature according to embodiments of the present invention.

A Ca—Mg (90-10 mol %)|LiCl—CaCl$_2$(65-35 mol %)|Pb system was assembled. The amounts of active components are listed in Table 2, example 4. The cell was operated at 650° C. with different current densities. The cut-off voltage for charging was 0.9 V at all current densities and the cut-off voltages for discharge were 0.4, 0.37, 0.34, and 0.31 V at 50, 100, 150, and 200 mAcm$^{-2}$, respectively. The cell performances are shown in FIGS. 9A and 9B. Coulombic efficiencies at 50, 100, 150, and 200 mAcm$^{-2}$ were 58, 68, 77, and 82%, respectively. Energy efficiencies at 50, 100, 150, and 200 mAcm$^{-2}$ 50, 51, 51, and 47%, respectively. The nominal discharge voltage at 50, 100, 150, and 200 mAcm$^{-2}$ were 0.52, 0.48, 0.45, and 0.41 V, respectively. In this cell, lithium co-deposited with calcium in both the negative and the positive electrodes. Therefore, the cell becomes Ca—Mg-Li|LiCl—CaCl$_2$|Pb cell.

Example 5

A Ca—Mg (90-10 mol %)|LiCl—CaCl$_2$(65-35 mol %)|Sb system was assembled. The amounts of active components are listed in Table 2, example 5. The cell was operated at 650° C. with different current densities. The cut-off voltage for charging was 1.3 V at all current densities and the cut-off voltages for discharge were 0.73, 0.70, 0.67, and 0.64 V at 50, 100, 150, and 200 mAcm$^{-2}$, respectively. The cell performances are shown in FIGS. 10A and 10B. Coulombic efficiencies at 50, 100, 150, and 200 mAcm$^{-2}$ were 84, 90, 94, and 95%, respectively. Coulombic efficiency increases with increasing current density of charge/discharge. Energy efficiencies at 50, 100, 150, and 200 mAcm$^{-2}$ were 78, 79, 77, and 74%, respectively. The nominal discharge voltage at 50, 100, 150, and 200 mAcm$^{-2}$ were 0.96, 0.93, 0.91, and 0.88 V, respectively. The cell successfully operated for 20 cycles at 200 mA cm$^{-2}$. In this cell, lithium co-deposited with calcium in both the negative and the positive electrodes. Therefore, the cell becomes Ca—Mg-Li|LiCl—CaCl$_2$|Sb cell.

Example 6

A Ca—Mg (90-10 mol %)|LiCl—CaCl$_2$ (65-35 mol %)|Pb-Mg (82-18 mol %) system was assembled with the foam negative current collector and mild steel crucible as mention in examples 1, 2, 3, 4, and 5. The amounts of active components are listed in Table 2, example 6. The cell was operated at 550° C. at 50-200 mAcm$^{-2}$ of current density. The cut-off voltage for charging was 0.9 V at all current densities and the cut-off voltages for discharge were 0.5, 0.47, 0.44, and 0.41 V at 50, 100, 150, and 200 mAcm$^{-2}$, respectively. The cell performances are shown in FIGS. 11A and 11B. Coulombic efficiencies were 97, 98, 99, and >100%, respectively. Energy efficiencies at 50, 100, 150, and 200 mAcm$^{-2}$ were 82, 75, 68, and 63%, respectively. The nominal discharge voltage at 50, 100, 150, and 200 mAcm$^{-2}$ were 0.55, 0.52, 0.49, and 0.46 V, respectively. The cell successfully operated for 20 cycles at 200 mA cm$^{-2}$. In this cell, lithium co-deposited with calcium in both the negative and the positive electrodes. Therefore, the cell becomes Ca—Mg-Li|LiCl—CaCl$_2$|Pb-Mg cell.

Although the above discussion discloses various exemplary embodiments of the invention, it should be apparent that those skilled in the art may make various modifications that will achieve some of the advantages of the invention without departing from the true scope of the invention.

What is claimed is:
1. An electrochemical cell configured to exchange energy with an external device, the electrochemical cell comprising:
   a negative electrode comprising at least a first active metal and a second active metal;

a positive electrode comprising a metal or alloy; and a molten salt electrolyte comprising a first cation of the first active metal and a second cation of the second active metal, the electrolyte defining first and second interfaces, the positive electrode being in contact with the electrolyte at the first interface and the negative electrode being in contact with the electrolyte at the second interface, the electrolyte configured to allow the cations of the first and second active metals to be transferred from the negative electrode to the positive electrode during discharging and to be transferred from the positive electrode to the negative electrode during charging, wherein the electrolyte exists as a liquid phase and the negative electrode and the positive electrode exist as liquid or partially liquid phases at operating temperatures of the electrochemical cell, the first active metal is calcium, and the second active metal is an alkali metal or an alkaline earth metal.

2. The electrochemical cell of claim 1, wherein the second active metal includes an alkali metal.

3. The electrochemical cell of claim 2, wherein the alkali metal is lithium.

4. The electrochemical cell of claim 1, wherein the negative electrode further includes an alkaline earth metal diluent.

5. The electrochemical cell of claim 4, wherein the alkaline earth metal diluent is magnesium.

6. The electrochemical cell of claim 2, wherein the electrolyte includes a halide salt of the alkali metal and a halide salt of calcium.

7. The electrochemical cell of claim 6, wherein the alkali metal includes lithium.

8. The electrochemical cell of claim 7, wherein the electrolyte includes lithium chloride and calcium chloride.

9. The electrochemical cell of claim 1, wherein the negative electrode includes a calcium-magnesium-lithium alloy, the electrolyte includes a lithium salt and a calcium salt, and both calcium and lithium are active metals.

10. The electrochemical cell of claim 1, wherein the cation of the active metals is selected from the group consisting of halides, oxides, chalcogenides, perchlorates, sulfates, sulfites, carbonates, nitrates, nitrites, hydroxides and combinations thereof.

11. The electrochemical cell of claim 1, wherein the positive electrode is selected from the group consisting of bismuth, lead, antimony, zinc, tin, magnesium, and combinations thereof.

12. A method of exchanging electrical energy with an external circuit, the method comprising:
providing an electrochemical cell according to claim 1;
connecting the electrochemical cell to the external circuit; and
operating the external circuit so as to drive transfer of the calcium and second active metal between the positive electrode and the negative electrode.

13. The method of claim 12, wherein the second active metal is an alkali metal.

14. The method of claim 13, wherein the electrolyte includes a halide salt of the alkali metal and a halide salt of calcium.

15. The method according to claim 12, wherein the external circuit comprises a load, a power transmission line, an electric power plant, a renewable energy source, or combinations thereof.

16. The electrochemical cell of claim 9, wherein the lithium salt is a lithium halide and the calcium salt is a calcium halide.

17. The electrochemical cell of claim 9, wherein the calcium-magnesium-lithium alloy is formed by discharging an electrochemical cell comprising: a negative electrode comprising calcium and magnesium, and an electrolyte comprising a lithium salt and a calcium salt.

* * * * *